Figure 1:
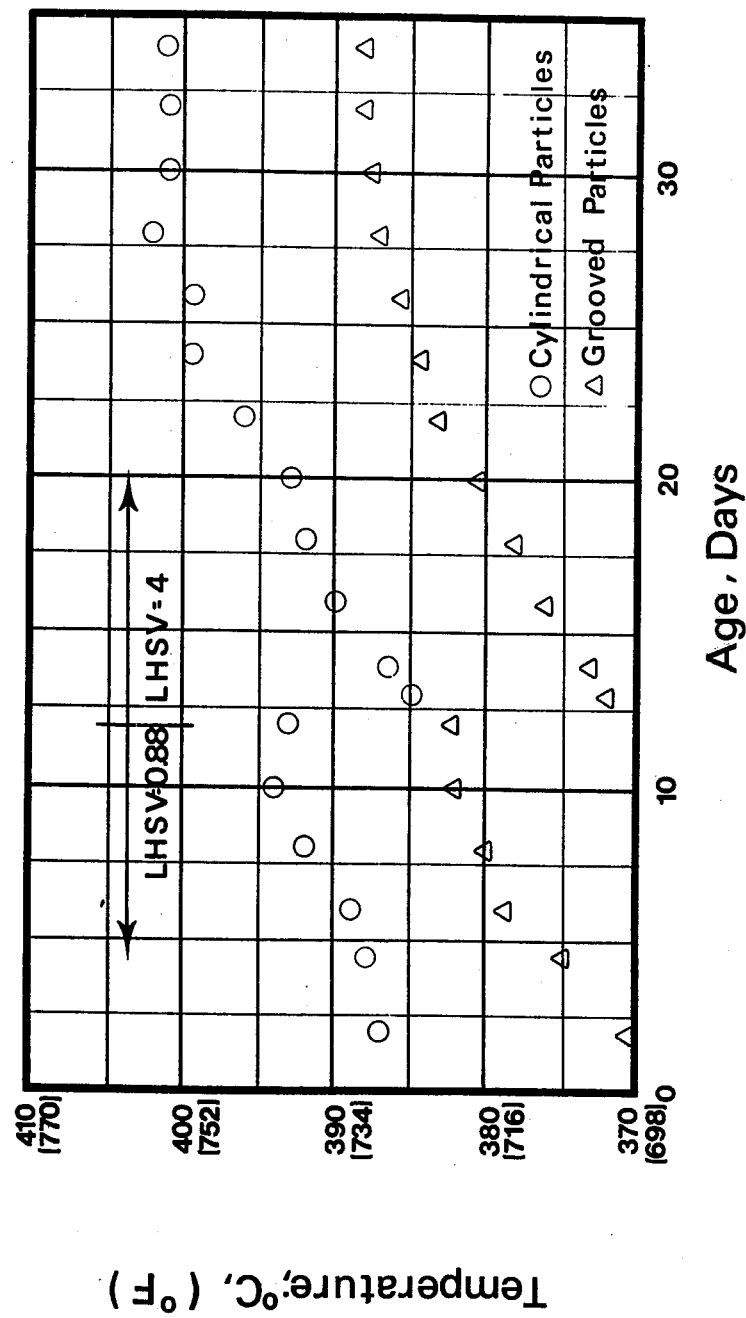

United States Patent [19]

Frayer et al.

[11] 4,118,310

[45] Oct. 3, 1978

[54] HYDRODESULFURIZATION PROCESS EMPLOYING A GUARD REACTOR

[75] Inventors: James Albert Frayer, Pittsburgh; Henri K. Lese, Monroeville; Joel Drexler McKinney, Pittsburgh; Kirk J. Metzer, Pittsburgh; John Angelo Paraskos, Pittsburgh, all of Pa.

[73] Assignee: Gulf Research & Development Company, Pittsburgh, Pa.

[21] Appl. No.: 810,858

[22] Filed: Jun. 28, 1977

[51] Int. Cl.$^2$ ............................................ C10G 23/02
[52] U.S. Cl. ................................................... 208/210
[58] Field of Search ............ 208/210, 216 R, 216 PP; 252/465

[56] References Cited

U.S. PATENT DOCUMENTS

| Re. 29,315 | 7/1977 | Carlson et al. | 208/216 R |
|---|---|---|---|
| 3,563,887 | 2/1971 | Fraser et al. | 208/216 R |
| 3,674,680 | 7/1972 | Hoekstra et al. | 208/216 R |
| 3,840,473 | 10/1974 | Beuther et al. | 208/216 |
| 3,990,964 | 11/1976 | Gustafson | 208/216 PP |
| 4,028,227 | 6/1977 | Gustafson | 208/216 PP |

Primary Examiner—George Crasanakis

[57] ABSTRACT

An asphaltene-containing oil hydrodesulfurization process employing a guard reactor and a main reactor in series, with the diameter of the guard reactor being smaller than the diameter of the main reactor. The catalyst in the guard reactor comprises particles of supported Group VI and Group VIII metals in the form of elongated extrudates whose surface is provided with a plurality of alternating longitudinal grooves and protrusions. An advantageous mass velocity-related activity effect is demonstrated when catalyst particles having this shape are disposed in a guard reactor having a smaller diameter than the diameter of the main reactor with which it is associated.

14 Claims, 3 Drawing Figures

Relationship Between Mass Velocity and Catalyst Particle Shape

Effect of Catalyst Particle Shape in Second Stage Hydrodesulfurization

HYDRODESULFURIZATION PROCESS EMPLOYING A GUARD REACTOR

This invention relates to a process for the hydrodesulfurization of metal- and sulfur-containing asphaltenic heavy oils employing a guard reactor and a main reactor in series, with the diameter of the guard reactor being smaller than the diameter of the main reactor.

The catalyst of the guard reactor and the main reactor both comprise supported Group VI and Group VIII metals. Suitable Group VI and Group VIII metal combinations include cobalt-molybdenum, nickel-tungsten and nickel-molybdenum. A preferred combination is nickel-cobalt-molybdenum. The catalyst can comprise 5 to 30 weight percent, generally, and 8 to 10 weight percent, preferably, of Group VI and Group VIII metals. The remainder of the catalyst composition includes a highly porous, non-cracking supporting material. Alumina is the preferred supporting material but other porous, non-cracking supports can be employed, such as silica-alumina and silica-magnesia. A substantial portion of the sulfur and metals in the feed oil are removed by the guard reactor catalyst.

If desired, the composition of all the catalyst in the main reactor or of a downstream layer only of catalyst in the main reactor can include a promoting amount of Group IV-B metal, said promoting amount being between 1 and 10 weight percent, generally, and between 2.5 and 8 weight percent, preferably. Suitable Group IV-B metals include titanium, zirconium or hafnium, preferably titanium. The composition of non-promoted catalyst, if any, employed in the main reactor, or in an upper catalyst layer only of the main reactor, can differ from the composition of the promoted catalyst by not containing a promoting amount of Group IV-B metal. In the promoted catalyst, the Group IV-B metal and the Group VI and VIII metals can be impregnated on the surface of the support in the manner disclosed U.S. Pat. No. 3,840,473, which is hereby incorporated by reference, as contrasted to being incorporated within the supporting material. A solution of titanium tetrachloride in n-heptane can typically be employed for the impregnation. Use of more than 8 to 10 weight percent of Group IV-B metal can be deleterious to hydrodesulfurization activity, as well as being economically wasteful. A molecular monolayer coverage of titanium oxide on commonly employed hydrodesulfurization catalyst supports would deposit about 5 to 8 weight percent of titanium on the catalyst. Use of more than a monolayer could tend to block catalyst pores and prevent access of large oil molecules to the catalyst interior. On the other hand, less than one weight percent of titanium will not promote the activity of a catalyst.

The preparation of the non-promoted catalyst of the guard reactor and of the main reactor, either of the entire main reactor or of an upper layer only of the main reactor, does not include a step for impregnation of Group IV-B metal on the supporting material, so that the non-promoted catalyst can be substantially free of Group IV-B metal. Although the particles of promoted and/or non-promoted catalyst in the main reactor may or may not have the grooved shape described below, it is essential to this invention that the catalyst particles in the guard reactor have the grooved shape described below. In general, the particles of the catalyst in the guard reactor have a surface provided with at least one groove and at least one protrusion. Preferably, the catalyst in the guard reactor is in the form of elongated extrudate particles whose surface is provided with a plurality of alternating longitudinal grooves and protrusions. If the catalyst particles in the main reactor do not have a similar grooved shape, they can have any other particulate form such as a cubical form, as needle-shaped or round granules, as spheres, as cylindrically-shaped extrudates, etc. With any of the non-grooved shapes, the smallest surface-to-surface particle dimension extending through the center or axis of the particles is generally between 1/20 and 1/40 inch (0.127 and 0.063 cm), preferably between 1/25 and 1/36 inch (0.102 and 0.071 cm), and most preferably between 1/29 and 1/34 inch (0.087 and 0.075 cm). The size of most or all of the particles will be within this range. The dimension characteristics for shaped or grooved particles of this invention are presented below.

A number of patents disclose the use of hydrodesulfurization catalyst particles having a multi-grooved shape. These include U.S. Pat. Nos. 3,674,680; 3,764,565; 3,857,780; 3,990,964 and 3,966,644. However, none of these patents discloses the advantageous activity effect of this invention achievable when the shaped particles are disposed in a guard reactor having a diameter smaller than the diameter of a main reactor.

In the accompanying drawings:

FIG. 1 compares graphically shaped and cylindrical catalyst particles in a first desulfurization reactor.

Figure 2:
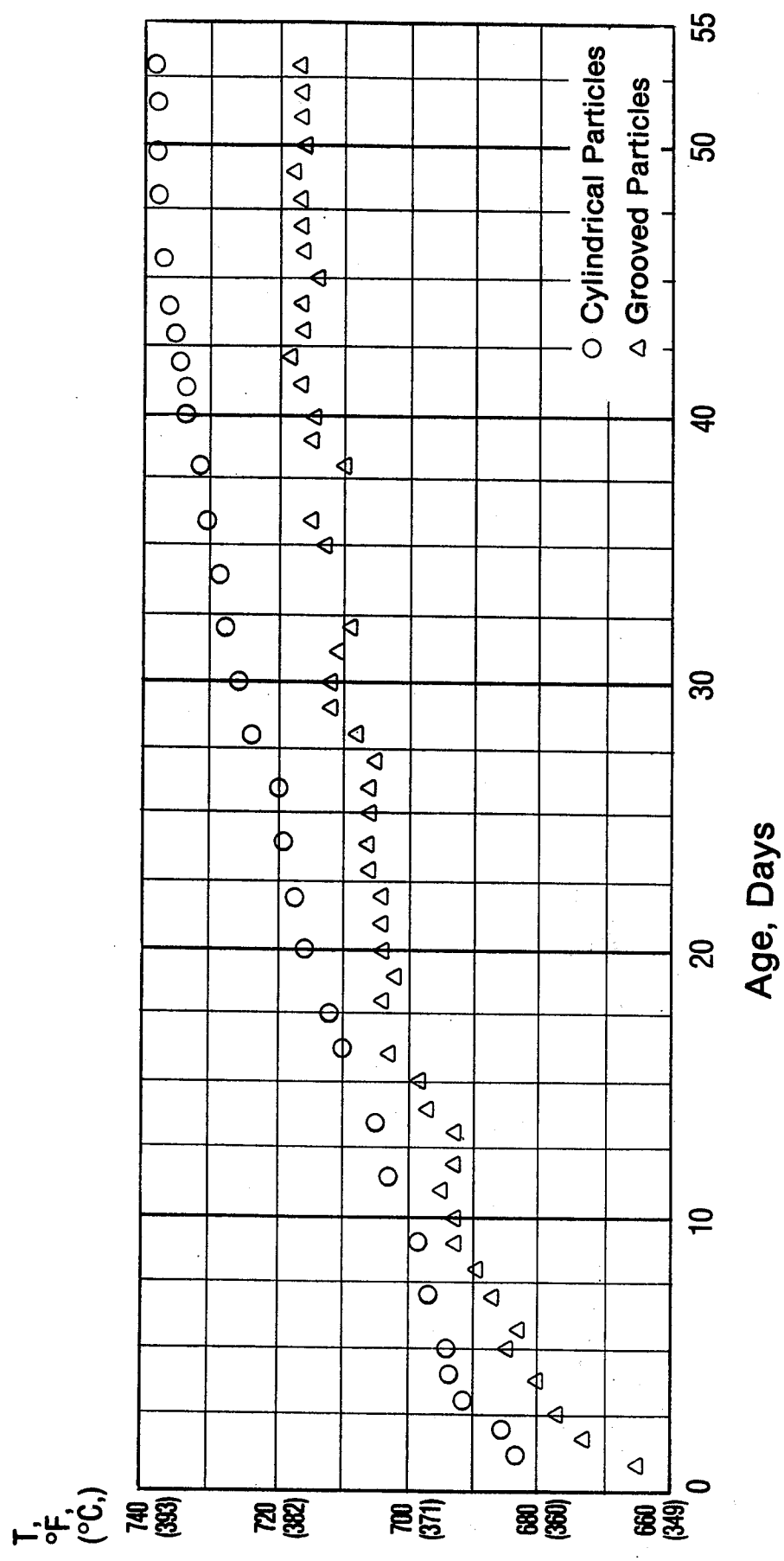

FIG. 2 compares graphically shaped and cylindrical catalyst particles in a second desulfurization reactor.

Figure 3:
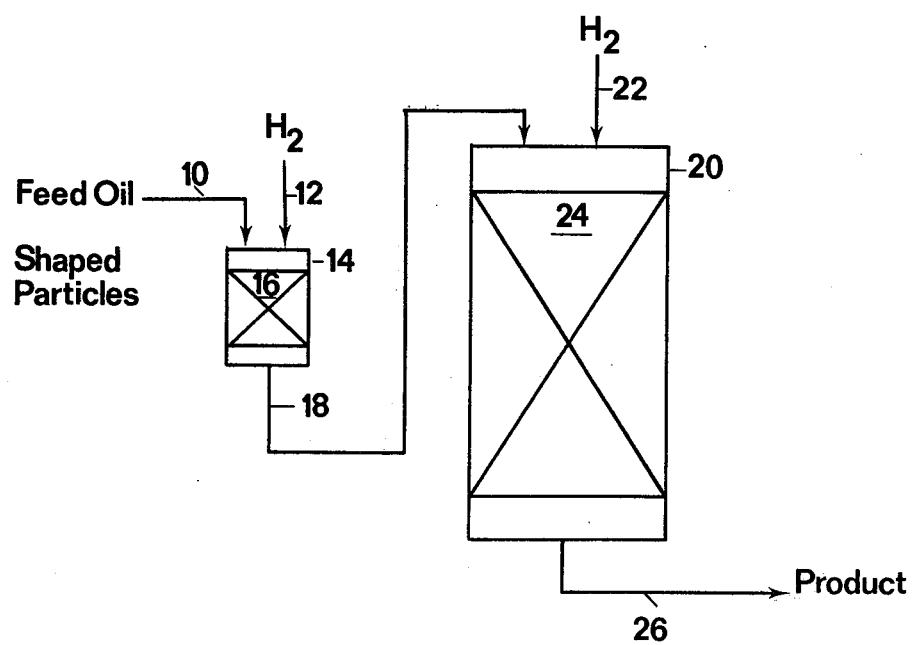

FIG. 3 illustrates a process scheme employing the shaped catalyst.

The shaped catalyst particles are solid and have a surface provided with at least one groove and at least one protrusion. Preferably, these particles are elongated extrudates having multiple alternating elongated straight or curved surface grooves or indentations and protrusions. The number of grooves can be between one or two and eight, although three or four are preferred. The grooves form alternating longitudinal projections, which can be rounded, extending along the length of the catalyst particle so that a view of a cross-section taken through the axis of a particle shows a plurality of surface projections which are joined by intersecting to form a unitary catalyst structure, providing particle strength in the intersecting region.

The "diameter" of the catalyst particle can be expressed as twice the shortest surface-to-central axis dimension. The measurement is made from the depth of the crevice which constitutes the deepest surface penetration between protrusions to the central axis of the particle. The "diameter" dimension as defined herein for the shaped catalyst particles of this invention is generally between about 1/15 and 1/60 inch (0.17 and 0.042 cm), preferably between about 1/20 and 1/55 inch (0.127 and 0.046 cm), and most preferably between about 1/25 and 1/50 inch (0.102 and 0.051 cm). The size of most or nearly all of the particles employed will be within this range. The corresponding "radius" dimensions will be one-half of these values, or generally between about 1/30 and 1/20 inch (0.085 and 0.021 cm), preferably between about 1/40 and 1/110 inch (0.064 and 0.023 cm), and most preferably between about 1/50 and 1/100 inch (0.051 and 0.025 cm).

It was surprisingly found that when a hydrodesulfurization catalyst with four projections formed by four grooves and having a 1/36 inch (0.07 cm) diameter dimension as defined herein was crushed to destroy the shape configuration of the original particles, thus forming smaller, granular particles 20 to 35 mesh (0.0165 to 0.0331 inch) (0.0419 to 0.0841 cm) in size, catalyst activity was not increased even though the surface area to volume ratio was increased by said crushing. On the other hand, it was found that crushing of a catalyst of similar composition in the form of cylindrical particles having a conventional diameter of 1/32 inch (0.08 cm) to the same mesh size did increase its activity. It is generally expected that any size reduction will increase catalyst activity because of a concomitant increase in particle surface area to volume ratio. Therefore, the absence of an activity increase due to particle size reduction for the shaped particles indicates that shaped particles within the size range of this invention surprisingly already possess an optimum activity due to particle shape. Since crushing did not increase catalyst activity, it would not be advantageous to employ particles of a smaller size than defined herein because such a smaller size would only tend to increase the pressure drop in the system without a concomitant activity advantage.

Possible reasons for the optimum activity due to particle size of the shaped catalyst of this invention is that the shape of the particle may induce a viscosity- or surface tension-related enhanced liquid hold-up or residence time or enhanced particle liquid wetting capacity in a reactor employing downward or trickle flow, as compared to the liquid residence time or liquid wetting capacity with non-grooved particles. The shaped catalyst of this invention provides multiple points of contact between adjacent particles, thereby minimizing close packing, increasing reactor void volume and increasing the particle zones which can be wetted. It should have been expected that the use of particles which increase reactor void volume would reduce catalytic activity because of the resulting lower volume of catalyst particles in a given volume of reactor space. However, the above-mentioned test comparing the activity of crushed and uncrushed shaped particles of this invention unexpectedly showed that shaped catalyst particles within the size range of this invention do not suffer an activity disadvantage due to a reduced volume of catalyst.

We have found that a shaped catalyst as described herein performs in an unexpectedly advantageous manner at high oil mass velocities. In a residual oil hydrodesulfurization test, shaped catalyst particles having four grooves and a 1/36 inch (0.07 cm) diameter dimension as defined above provided a 21.6° F. (12° C.) temperature advantage relative to cylindrical particles having a conventional diameter of 1/32 inch (0.08 cm) at a 0.88 liquid hourly space velocity, whereas at a liquid hourly space velocity of 4 the temperature advantage increased to 24.3° F. (13.5° C.), all other process conditions remaining unchanged. Operationally, mass velocity can be increased at any given space velocity by increasing the catalyst bed depth. At a fixed space velocity and a fixed catalyst volume, increasing the catalyst bed depth is equivalent to reducing the diameter of the bed. Therefore, the observed advantage arising from an increased mass velocity renders the shaped catalyst particles particularly advantageous for use in a reactor whose diameter is smaller than the diameter of an associated reactor containing non-shaped particles by an amount which provides a relatively high mass velocity with the shaped catalyst particles. Since mass velocity is defined as the weight of liquid flow per unit area of reactor cross-section per unit time, the mass velocity will increase exponentially with a decrease in reactor diameter at a given space velocity.

The discovered mass velocity effect can be advantageously embodied in a guard reactor having a relatively small diameter relative to the diameter of a main reactor in a process where the catalyst in the main reactor experiences an extended life relative to the guard chamber catalyst, permitting the catalyst in the guard chamber to undergo multiple replacements, i.e. two or more replacements, for each catalyst change in the main reactor. The diameter of the guard reactor can be 5, 10, 20 or even 30 percent, or more, smaller than the diameter of the main reactor.

The shaped catalyst particles of this invention can be further defined as concave particles, as contrasted to convex particles. A geometric solid is defined as convex if all pairs of points lying within or on the surface of the solid can be connected by a straight line which is completely contained within the surface. Spherical and cylindrical particles are convex. Conversely, a geometric solid is concave if at least one pair of points lying within or on the surface of the solid can be connected by a straight line which is not completely contained within or on the surface of the solid. The geometric volume of the smallest convex solid containing a concave solid will be greater than the geometric volume of the concave solid. Letting $V_x$ equal the volume of the minimum convex solid which can contain a specified concave solid and $V_c$ equal the volume of the contained concave solid, a resulting concavity index factor C can be defined as:

$$C = V_x/V_c$$

A concave geometric solid has a concavity index greater than one. The concavity index of the shaped catalyst particles of this invention is generally between about 1.01 and 1.35, preferably is between about 1.03 or 1.05 and 1.25, and most preferably is between about 1.10 and 1.20.

The external surface area to volume ratio of the shaped catalyst particles of this invention is generally between about 80 and 200 1/inches (31.1 and 78.7 1/cm), and preferably is between about 100 and 180 1/inches (39.4 and 70.8 1/cm). The internal surface area of the shaped catalyst can be between about 100 and 350 square meters per gram.

The shaped catalyst particles of this invention will have a total pore volume in the range of about 0.3 to 0.85 cubic centimeters per gram, according to the BET method of measurement, with more than half of the pore volume being in pores having a radius between 50 and 300 A.

As discussed above, the shaped catalyst particles of this invention will provide a higher reactor void volume than cylindrically shaped particles. If $V_p$ equals the volume of each particle, including pore volume, times the number of particles, and $V_v$ equals the volume of the total reactor void space, excluding pore volume; then the void fraction is:

$$V_v/V_v + V_p$$

The void fraction in a reactor employing shaped catalyst particles of this invention is between about 0.20 and 0.95, generally, and preferably is between about 0.25 and 0.55.

The process of this invention utilizes a guard reactor and at least one main reactor in series, with the diameter of the guard reactor, which contains the shaped catalyst particles, being smaller than the diameter of the main reactor. The smaller diameter of the guard reactor tends to induce a mass velocity-related activity advantage which is specific to the shaped particles. At the same time, it affords a considerable economic advantage because the required wall thickness at a given pressure and temperature in a hydrodesulfurization reactor increases with increases in reactor diameter.

In the present process, the feed oil, together with hydrogen, initially flows downwardly in trickle flow through a guard reactor containing a fixed bed of non-promoted catalyst. The diameter of the guard reactor is smaller than the diameter of the main reactor. The guard reactor catalyst removes a significant portion or most of the feed metals and sulfur from the oil. The oil is then passed with hydrogen downwardly in trickle flow through a fixed bed of the catalyst in the main reactor. The entire main reactor can contain the promoted catalyst described above, or the entire main reactor or an upstream layer only of the main reactor can contain the non-promoted catalyst, with the remainder of the main reactor containing the promoted catalyst. The quantity of catalyst in the guard reactor is smaller than the quantity of catalyst in the main reactor and the guard reactor can undergo two or more catalyst changes for every change of catalyst in the main reactor.

The hydrodesulfurization process of this invention employs a hydrogen partial pressure of 1,000 to 5,000 psi (70 to 350 kg/cm$^2$), generally, 1,000 to 3,000 psi (70 to 210 kg/cm$^2$, preferably, and 1,500 to 2,500 psi (105 to 175 kg/cm$^2$), most preferably.

The gas circulation rate can be between 1,000 and 20,000 SCF/B (17.8 and 356 SCM/100L), generally, or preferably about 2,000 to 10,000 SCF/B (35.6 to 178 SCM/100L). The gas circulated preferably contains 85 percent or more of hydrogen. The mol ratio of hydrogen to oil can be between about 4:1 and 80:1. Reactor temperatures can vary between about 600° and 900° F. (316° and 482° C.), generally, and between 650° and 800° F. (343° and 427° C.), preferably. Reactor temperatures are increased during a catalyst cycle to compensate for activity aging loss. The temperature should be sufficiently low so that not more than 30 percent, generally, and preferably not more than about 10, 15 or 20 percent of the 650° F.+ (343° C.+) feed oil will be cracked to material boiling below 650° F. (343° C.). Very little hydrocracking occurs in the process and most of the product, or at least 70, 80 or 90 percent of the total product boils above the IBP of the feed oil. The liquid hourly space velocity in each reactor can be between about 0.1 and 10, generally, and between about 0.2 and 1.25, preferably, volumes of oil per hour per volume of catalyst.

The feed to the guard reactor of the process of this invention can be a full petroleum crude or an atmospheric or vacuum tower reduced crude containing substantially all of the residual asphaltenes of the full crude. The process is also useful for desulfurizing other asphaltene-containing oils, such as coal liquids and oils extracted from shale and tar sands. Asphaltenes have a relatively low hydrogen to carbon ratio as compared to lower boiling oils and will generally comprise less than about 30 percent of the feed oil, but will generally contain most of the metallic components present in the total feed, such as nickel and vanadium. Since conventional desulfurization catalysts have a high activity for demetallization as well as for desulfurization, the guard reactor can remove a significant amount or most of the nickel and vanadium from the charge stock, as well as a significant amount or most of the sulfur. These metals tend to deposit on the catalyst and to reduce the desulfurization activity of the catalyst. Removed nickel and vanadium generally account for the ultimate deactivation of the guard reactor catalyst, while coke deposition contributes very little to guard reactor catalyst deactivation.

Since atmospheric or vacuum reduced crudes contain substantially the entire asphaltene fraction of the crude from which they are derived, they typically contain 95 to 99 weight percent or more of the nickel and vanadium content of the full crude. The nickel, vanadium and sulfur content of petroleum residual oils can vary over a wide range. For example, nickel and vanadium can comprise 0.002 to 0.03 weight percent (20 to 300 parts per million), or more, of a residual oil, while sulfur can comprise about 2 to 7 weight percent, or more, of the oil.

In the guard reactor of the present process, the nickel and vanadium accumulate in the catalyst particle, ultimately causing the catalyst pores to become blocked. Upon blockage of the pores the aging rate of the guard reactor catalyst ceases to be gradual and the catalyst aging rate increases abruptly to terminate the catalyst cycle. Therefore, the guard reactor will contain a smaller quantity of catalyst than is contained in the main reactor and the guard reactor will experience two or more fills for each catalyst loading in the main reactor.

The Group VI and Group VIII metals which are conventionally employed in hydrodesulfurization catalysts primarily impart desulfurization activity. Group IV-B metal-promoted catalysts which are optionally employed in the main reactor of this invention improve the desulfurization activity of Group VI and VIII catalytic metals, but Group IV-B metals are relatively expensive to use and increase the cost of the catalyst. It was shown in U.S. Pat. No. 3,968,027 that the improvement in desulfurization activity imparted by the promoted catalyst in an upstream hydrodesulfurization stage is much less than the improvement in desulfurization activity which is imparted by the promoted catalyst in a downstream stage. Furthermore, it was shown in U.S. Pat. No. 3,968,027 that this relatively smaller advantage of the promoted catalyst over the non-promoted catalyst in an upstream hydrodesulfurization stage declines with progressive age, while the relatively larger desulfurization activity advantage of the promoted catalyst over the non-promoted catalyst in a downstream stage steadily increases with progressive catalyst age. A further disadvantage in the use of the promoted catalyst in an upstream stage, such as a guard reactor, is that the life of any first stage catalyst is ultimately limited by relatively rapid and irreversible metals deactivation, and regardless of the desulfurization activity of the upstream catalyst the total weight of sulfur that can be removed with any upstream catalyst is limited by metals deposition on the catalyst. This factor renders it less economic in processing most higher metals residua to incur the additional cost of the promoted catalyst in a guard chamber.

In accordance with this invention, a non-promoted catalyst is employed in the guard chamber and optionally throughout the main reactor or in an upstream zone only of the main reactor, and the promoted catalyst can be employed optionally either throughout the main reactor or in a downstream zone only of the main reactor. Although it is essential that the catalyst particles in the guard reactor have the shaped configuration described above, the promoted and/or non-promoted catalyst particles in the main reactor may or may not have this configuration. Although not required, a gas flashing step can be disposed between the guard reactor and the main reactor.

In the tests of the following examples, the promoted catalyst, regardless of shape, comprises alumina which was impregnated with molybdenum, nickel and titanium, and contained three weight percent nickel, eight weight percent molybdenum and five weight percent titanium, impregnated on an alumina support. The non-promoted catalyst used in the following tests, regardless of shape, contained one-half weight percent nickel, one weight percent cobalt, eight weight percent molybdenum, impregnated on an alumina support. All cylindrically shaped catalysts tested, regardless of composition, had a conventional surface-to-surface diameter through the axis of the particle of 1/32 inch (0.8 cm), and all shaped catalysts tested, regardless of composition, had four longitudinal alternating projections and grooves on the particle surface providing a concavity index of 1.15, and the dimension of twice the shortest surface-to-central axis distance was 1/36 inch (0.07 cm).

EXAMPLE 1

A test was conducted to illustrate the discovered mass velocity effect demonstrated by shaped catalyst particles. In this test, separate portions of a 650° F.+ (343° C.+) Kuwait ATB containing 3.8 weight percent sulfur were hydrodesulfurized at a hydrogen pressure of 1,950 psi (136.5 kg/cm$^2$) employing a hydrogen rate of 7,400 SCF/B (133.2 SCM/100L). One portion of the feed oil was passed downwardly in trickle flow with hydrogen through one first stage reactor containing non-promoted catalyst particles of cylindrical shape as described above. The other portion of the feed oil was passed downwardly in trickle flow with hydrogen through another first stage reactor of the same size containing non-promoted shaped catalyst particles as described above.

At the start of the test the liquid hourly space velocity in each reactor was 0.88 volumes of liquid per hour per volume of catalyst. The temperature in each reactor was increased gradually with catalyst age so that a constant liquid product containing 0.95 weight percent of sulfur was recovered from each reactor. Reactant flow was continued through each reactor for about 12 days at the indicated space velocity whereupon the space velocity was increased to 4, so that the mass velocity also increased. At the higher space velocity the temperature in each reactor was similarly gradually increased with catalyst age so that a constant liquid product containing 2.4 weight percent of sulfur was recovered from each reactor.

FIG. 1 shows the temperature requirements in each reactor over the period of these tests. FIG. 1 shows that throughout the tests the temperature requirement in the reactor containing the shaped catalyst particles was lower than the temperature requirement in the reactor containing the cylindrical catalyst particles. FIG. 1 contains the additional surprising showing that the temperature advantage in favor of the shaped catalyst was higher at at the higher space velocity. For example, just prior to the increase in space velocity the temperature advantage in favor of the shaped catalyst was 21.6° F. (12° C.) while the average temperature advantage in favor of the shaped catalyst at the free three data points after the space velocity change was 24.3° F. (13.5° C.). Therefore, the temperature advantage for the shaped catalyst was found to increase significantly with an increase in mass velocity through the system, indicating that an advantageous effect can be achieved when utilizing the shaped catalyst particles of this invention in a reactor of relatively small diameter, since any reduction in reactor diameter will induce an exponential increase in mass velocity at a given space velocity.

EXAMPLE 2

Comparative tests were conducted to illustrate the discovered mass velocity effect demonstrated by the shaped catalyst particles in a second stage hydrodesulfurization operation utilizing a promoted catalyst. The feed oil in each test was the effluent obtained from a first hydrodesulfurization stage in which Kuwait ATB containing 3.8 weight percent sulfur was hydrodesulfurized to a 1.09 weight percent sulfur level. In these tests, individual portions of the first stage effluent together with 4,000 SCF of hydrogen per barrel (72 SCM/100L) were respectively passed downwardly in trickle flow over separate beds of cylindrical and shaped promoted catalysts, as described above, for a period of more than 50 days at 1 LHSV and at a pressure of 2,100 psi (147 kg/cm$^2$) to accomplish about 71 percent desulfurization. At the end of this period, the shaped catalyst was 15° F. (8.3° C.) more active than the cylindrical catalyst when producing a desulfurized product containing 0.37 weight percent sulfur. The liquid space velocity was then increased to 3.99, effecting a fourfold increase in mass velocity. The temperature in each reactor was then adjusted to produce a product containing 0.65 weight percent sulfur. Under these conditions, the shaped catalyst was 22° F. (12.2° C.) more active than the cylindrical catalyst, whereas the expected activity difference was only 16° F. (9° C.). This demonstrates that in second stage operation the activity of the shaped promoted catalyst is improved to an unexpectedly great extent by an increase in mass velocity, as compared to a similar but non-promoted catalyst.

EXAMPLE 3

Tests were conducted to illustrate the advantageous effect of shaped promoted catalyst particles as described above in a second stage residual oil hydrodesulfurization reactor, as compared to the operation of a similar second stage hydrodesulfurization reactor operated under similar conditions except that cylindrically shaped promoted catalyst particles as described above were utilized. The feed oil employed in each test was a topped 650° F.+ (343° C.+) residual oil containing 1.09 weight percent sulfur which was the effluent obtained from single stage hydrodesulfurization of a 650° F.+ (343° C.+) Kuwait ATB containing 3.8 weight percent sulfur with a non-promoted catalyst.

The tests were performed in individual reactors of equal diameter with feed oil being passed downwardly in trickle flow over the catalyst. In each test, the LHSV was 1.0 volume of oil per hour per volume of catalyst, the hydrogen pressure was 2,100 psi (147 kg/cm$^2$) and the hydrogen rate was 4,000 SCF/B (72 SCM/100L). The temperature was gradually increased with catalyst age in each test to produce a liquid product containing 0.32 weight percent sulfur.

FIG. 2 shows the temperature requirements in each reactor over the test period. FIG. 2 shows that throughout the test period the temperature requirement in the reactor containing the shaped catalyst was lower than the temperature requirement in the reactor containing the cylindrical catalyst, indicating the relatively higher catalytic activity for the shaped catalyst. Moreover, FIG. 2 surprisingly shows that the relative temperature advantage in favor or the shaped catalyst increases with increasing catalyst age. For example, the relative temperature advantage for the shaped catalyst was 10° F. (5.5° C.) at a catalyst age of 5 days and increased somewhat to 12° F. (6.6° C.) at a catalyst age of 20 days. The temperature advantage increased slightly to 13° F. (7.2° C.) at 30 days. However, at 40 days the temperature advantage increased drastically to 19° F. (10.5° C.). Finally at 53 days the temperature advantage in favor of the shaped catalyst widened to 21° F. (11.7° C.). At 53 days the temperature curve for the shaped catalyst appears essentially flat. In fact, FIG. 2 shows that the temperature curve for the shaped catalyst started to flatten at between 9 and 20 days and maintained a relatively plateau-like configuration after 20 days, whereas the temperature curve for the cylindrical catalyst failed to achieve a plateau during this period. Since aging of the second stage catalyst is almost entirely due to coke formation, the flattening temperature curve for the shaped catalyst indicates that the coke on the shaped catalyst has reached an equilibrium level, i.e. old coke is being removed from the catalyst as rapidly as new coke is being deposited. At the indicated stage of catalyst age, this situation has not been achieved for the cylindrical catalyst.

In contrast to the widening temperature advantage for the shaped promoted catalyst in second stage operation relative to a cylindrical promoted catalyst, as shown in FIG. 2, FIG. 1 fails to show a comparable widening temperature advantage in a first stage residual oil hydrodesulfurization operation employing non-promoted shaped and cylindrical catalysts, nor does is show a comparable plateau-like aging curve for the shaped non-promoted catalyst. Therefore, it is apparent that the advantage illustrated in FIG. 2 for the shaped catalyst is specific to second stage operation employing a catalyst promoted with a Group IV-B metal. Because the second stage promoted catalyst aging curve developed a plateau, a comparison of FIGS. 1 and 2 shows that the promoted shaped catalyst in the second stage permitted a lower operating temperature than prevailed in first stage operation.

EXAMPLE 4

A test was conducted to illustrate the exceptionally high activity of the shaped catalyst particles described above. In performing these tests, a fresh sample of shaped non-promoted catalyst particles as described above was crushed to destroy the particle shape and produce generally spherical particles between 20 and 35 mesh in size (0.0165 to 0.0331 inch) (0.0419 to 0.0841 cm). Crushing increased the surface area to volume ratio from 140/inch to about 240 1/inch (53 1/cm to 94 1/cm). The hydrodesulfurization activity of the crushed shaped particles was tested for comparison with the hydrodesulfurization activity of the uncrushed shaped particles. For comparative purposes, a fresh sample of non-promoted cylindrical extrudates as described above whose surface area to volume ratio was 145 1/inch (57 1/cm) was crushed to form generally spherical particles between 20 and 35 mesh in size (0.0165 to 0.0331 inch) (0.0419 to 0.0841 cm), having a surface area to volume ratio of about 240 1/inch (94 1/cm). The hydrodesulfurization activity of the crushed cylindrical extrudates was tested for comparison with the hydrodesulfurization activity of the uncrushed cylindrical extrudates. All the hydrodesulfurization tests were performed with a 650° F. (343° C.) Kuwait ATB containing 3.80 weight percent sulfur in first stage downward trickle flow operation to reduce the sulfur content of the oil to a constant sulfur content of 0.95 weight percent. The following table shows the temperatures required to maintain this product sulfur level at various catalyst ages.

| Age, days | TEMPERATURE, ° C. | | | |
| --- | --- | --- | --- | --- |
| | Uncrushed shaped particles | Crushed shaped particles | Uncrushed cylindrical particles | Crushed cylindrical particles |
| 0.5 | — | 363 | — | 366 |
| 1.5 | — | 367 | — | 370 |
| 2.0 | 370.5 | — | 387 | — |
| 2.5 | — | 372 | — | 372 |
| 3.5 | — | 372 | — | 372 |
| 4.0 | — | — | 388 | — |
| 4.5 | 375 | 375 | — | 374 |

The above table shows that the uncrushed cylindrical particles required a temperature about 13° to 16.5° C. higher than was required by the uncrushed shaped particles. This temperature advantage is also illustrated in the aging curve of FIG. 1. While the temperature requirement for the cylindrical particles was reduced considerably by crushing, the table shows that crushing of the shaped particles did not affect the temperature requirement, even though the surface area to volume ratio was increased by crushing. This indicates that the shaped particles, unlike the cylindrical particles, had already achieved an optimum activity based upon particle size. This observation is highly surprising because it has been generally assumed that particle size reduction would automaticlly increase the activity of a catalyst particle due to an increase in the surface area to volume ratio.

FIG. 3 illustrates a process scheme of this invention. As shown in FIG. 3, feed oil is charged through line 10 and recycle hydrogen is charged through line 12 to the top of guard reactor 14 containing a stationary bed 16 of non-promoted catalyst in the form of shaped particles. Guard reactor 14 has a relatively small diameter and a relatively small amount of catalyst, compared to second stage reactor 20, so that the liquid mass velocity in guard reactor 14 is less than in main reactor 20. The oil in guard reactor 14 flows downwardly in trickle flow over the catalyst in bed 16. First stage effluent in line 18 is passed to main reactor 20. If desired, a flash chamber, not shown, for removal of contaminant gases can be provided between the guard reactor and main reactor. Make-up and recycle hydrogen can be charged to main reactor 20 through line 22. Main reactor 20 contains a stationary bed 24 of either promoted or non-promoted catalyst, which may or may not be in the form of shaped particles. If desired, main reactor 20 can contain a lower layer of promoted catalyst and an upper layer of non-promoted catalyst, each layer of which may or may not be in the form of shaped particles. The diameter of guard reactor 14 can be smaller than the diameter of main reactor 20 by 5, 10, 20 or even 30 percent, or more.

This difference in diameter will have an exponential effect upon the mass velocity in guard reactor 14. Product is removed from the second stage through line 26.

We claim:

1. In a process for the hydrodesulfurization of an asphaltene-containing oil containing sulfur and metals at a hydrogen pressure between 1,000 and 5,000 psi and a temperature between 600° and 900° F. wherein said oil and hydrogen are passed downwardly in trickle flow through upstream and downstream reactors in series and wherein the catalyst in both reactors comprises Group VI and Group VIII metals on a non-cracking support, the invention comprising the particles of said catalyst in said upstream reactor comprising elongated extrudates which show in cross-section at least one groove defining protrusions and an average concavity index between about 1.01 and 1.35, the shortest distance between the depth of said at least one groove and the center in said cross-section being between 1/30 and 1/120 inch, and employing a higher liquid mass velocity in said upstream reactor than in said downstream reactor, said higher liquid mass velocity permitting a given amount of desulfurization in said upstream reactor at a lower temperature than the temperature required at the liquid mass velocity of the downstream reactor.

2. The process of claim 1 wherein the diameter of said upstream reactor is smaller than the diameter of said downstream reactor.

3. The process of claim 2 wherein the diameter of said upstream reactor is at least 5 percent smaller than the diameter of said downstream reactor.

4. The process of claim 2 wherein the diameter of said upstream reactor is at least 30 percent smaller than the diameter of said downstream reactor.

5. The process of claim 1 wherein the particles of the catalyst in said upstream reactor are provided with a plurality of grooves defining more than two protrusions.

6. The process of claim 1 wherein the catalyst in said downstream reactor contains a promoting amount comprising between about 1 and 10 weight percent based on total catalyst weight of Group IV-B metal.

7. The process of claim 1 wherein the particles of said catalyst in said downstream reactor comprise elongated extrudates which show in cross-section a plurality of grooves defining more than two protrustions and an average concavity index between about 1.01 and 1.35, with the shortest distance between the depth of said grooves and the center in said cross-section being between 1/30 and 1/120 inch.

8. The process of claim 1 wherein the particles of catalyst in said upstream reactor have between two and eight elongated grooves.

9. The process of claim 1 wherein said average concavity index is between 1.05 and 1.25.

10. The process of claim 1 wherein said average concavity index is between 1.10 and 1.20.

11. The process of claim 1 wherein said shortest distance is between 1/40 and 1/110 inch.

12. The process of claim 1 wherein said shortest distance is between 1/50 and 1/100 inch.

13. The process of claim 6 wherein said Group IV-B metal is titanium.

14. The process of claim 1 including changing the catalyst in the upstream reactor at least twice for each change in catalyst in the downstream reactor.

* * * * *

UNITED STATES PATENT OFFICE
CERTIFICATE OF CORRECTION

Patent No. 4,118,310    Dated October 3, 1978

Inventor(s) Frayer, Lese, McKinney, Metzger and Paraskos

It is certified that error appears in the above-identified patent and that said Letters Patent are hereby corrected as shown below:

COL. 2, line 61, "1/20" should read --1/120--.

COL. 8, line 4, "free" should read --first--.

Signed and Sealed this

Thirteenth Day of February 1979

[SEAL]

Attest:

RUTH C. MASON
Attesting Officer

DONALD W. BANNER
Commissioner of Patents and Trademarks